United States Patent [19]

Blessing et al.

[11] Patent Number: 4,795,913
[45] Date of Patent: Jan. 3, 1989

[54] HIGH RESOLUTION OPTICAL FIBER ARRAY AND ARTICLE POSITION DETERMINING SYSTEM

[75] Inventors: Hubert Blessing, Dallas; Gene F. Croyle, Plano, both of Tex.

[73] Assignee: Levi Strauss & Co., San Francisco, Calif.

[21] Appl. No.: 83,902

[22] Filed: Aug. 6, 1987

Related U.S. Application Data

[63] Continuation of Ser. No. 805,271, Dec. 5, 1985.

[51] Int. Cl.⁴ .............................................. G01N 21/86
[52] U.S. Cl. .................................... 250/561; 250/571; 250/227
[58] Field of Search ............ 250/561, 227, 578, 222.1, 250/560; 364/562, 575; 356/376, 379, 380

[56] References Cited

U.S. PATENT DOCUMENTS

| | | | |
|---|---|---|---|
| 3,072,081 | 1/1963 | Milligan et al. | 112/2 |
| 3,104,191 | 9/1963 | Hicks, Jr. et al. | 156/174 |
| 3,430,057 | 2/1969 | Genahr | 250/227 |
| 3,609,373 | 12/1971 | Desai | 250/202 |
| 3,621,266 | 11/1971 | Akuta et al. | 250/560 |
| 3,727,567 | 4/1973 | Beazley | 112/121.11 |
| 3,761,723 | 9/1973 | DeCock | 250/227 |
| 3,867,889 | 4/1975 | Conner, Jr. | 112/121.11 |
| 3,987,301 | 10/1976 | O'Connor | 250/227 |
| 4,105,925 | 7/1978 | Rossol et al. | 250/561 |
| 4,146,797 | 4/1979 | Nakagawa | 250/548 |
| 4,149,091 | 4/1979 | Crean et al. | 250/566 |
| 4,376,415 | 3/1983 | Willenbacher | 112/121.11 |
| 4,562,344 | 12/1985 | Mihara et al. | 250/227 |
| 4,707,600 | 11/1987 | Nakao et al. | 250/227 |

OTHER PUBLICATIONS

Machine Vision for Robotics and Automatic Inspection, vol. I, *Fundamentals*, by R. K. Miller—Chap. 2, "Cameras, Pixels and Lighting", pp. 9–20.
Machine Vision for Robotics and Automatic Inspection, vol. I, *Fundamentals*, by R. K. Miller—Chap. 4, "Model Machine Vision Systems", pp. 39–60.
Machine Vision for Robotics and Automatic Inspection, vol. I, *Fundamentals*, by R. K. Miller—Chap. 9, "General Methods to Enable Robots with Vision to Acquire, Orient and Transport Workpieces", pp. 116–134.

*Primary Examiner*—Edward P. Westin
*Assistant Examiner*—Charles Wieland
*Attorney, Agent, or Firm*—Hubbard, Thurman, Turner & Tucker

[57] ABSTRACT

A vision apparatus for indicating the locations of edges of work pieces in an illuminated work area including several arrays where each array includes several light conducting fibers. One end of the array is positioned in the work area to be illuminated by light except when blocked by the object. The other end of the optical fibers are positioned in a matrix plate contained within a camera enclosure. The camera enclosure further includes a lens to optically couple light from the matrix plate optical fiber ends to a light sensing device that produces electrical signals indicating the presence or absence of light at each of the fiber ends.

30 Claims, 6 Drawing Sheets

HIGH RESOLUTION OPTICAL FIBER ARRAY AND ARTICLE POSITION DETERMINING SYSTEM

This application is a continuation of application Ser. No. 805,271, filed Dec. 5, 1985.

BACKGROUND

1. Field of the Invention

This invention relates to automated vision systems for manufacturing and more particularly to a vision system for determining article positions during a manufacturing process.

2. Description of Related Information

Recently there has been increased interest in machine vision devices for industrial applications. This increased interest is attributed to the increased research in computer technology. Usually, the first step in vision analysis by a machine vision device is the conversion of analog pixel (picture element) data into digital data for processing by a computer. Historically, several different types of devices have been used. Most commonly used in early applications were the vidicon video tube cameras that produced analog video signals. More recently solid state cameras or cameras using charge-coupled devices (CCD) have been used. The use of the vidicon cameras and the solid state cameras is discussed in Chapter 2 of *Machine Vision for Robotics and Automated Inspection, Vol. I—Fundamentals*, by Richard K. Miller, published by Technical Insights, Inc. which is herein incorporated by reference. Chapter 4 entitled "Model Machine Vision Systems" and Chapter 9 entitled "General Methods to Enable Robots with Vision to Acquire, Orient and Transport Work Pieces" of this publication disclose different techniques used in the prior art to detect and determine the position of different objects.

A common technique used by these prior art vision systems is to take an N by M array representing the pixel elements of a view of the object and produce data representing this N by M array for analysis by a computer. As should be appreciated by those skilled in the art, such an analysis usually requires extensive computer resources and time to complete the analysis. Therefore, the use of vision systems in real time computer operations for support of manufacturing processing has been limited.

One early attempt to solve this problem is disclosed in U.S. Pat. No. 4,105,925 entitled "Optical Object Locator" which discloses a device for determining the position and orientation of an object on a conveyor by the use of two planes of light that intersect in a single transverse line on a conveyor surface. A linear diode array that is aligned along the single line of light on the conveyor detects light from that line by electronic sampling of the lumination of this linear array. Object boundaries are determined and object shape and orientation may thus be determined. Another patent entitled "Light Collection Apparatus" disclosed in U.S. Pat. No. 3,987,301 discloses an apparatus for detecting the presence of extraneous matter and/or cracks in translucent containers. The light collection apparatus incorporates an array of fiber optics elements arranged to perform an accurate and controllable method of light collection.

A further attempt at solving this problem is disclosed in "Device for Detecting the Position of Web Side Edge" in U.S. Pat. No. 4,146,797 which includes a single light emitting source, a lens to form a beam of light in the vicinity of a reference point and an optical fiber to transmit the light to a photoelectric converter. The output of the photoelectric converter is used to determine when the edge of the web has been detected.

The present invention has been embodied in an apparatus to provide vision information for a manufacturing environment. An object of the present invention is to provide a non-complex vision system that indicates the location and positioning of an article used in manufacture.

A further object of the present invention is to provide a vision apparatus that provides a digital output without having to perform analog to digital data conversions.

A further object of the present invention is to provide a vision apparatus that allows variations in optical resolution.

SUMMARY OF THE INVENTION

In accordance with the present invention a vision apparatus for detecting the presence of an object as the object passes across a lighted surface is provided. At least one light receiving array is located on the surface of a path traveled by an object. This light receiving array includes a light transfer device for conducting light radiated upon the light receiving array to an optical sensor. The optical sensor produces an electrical signal indicating what portion of the light receiving array is receiving light.

In one embodiment of the present invention the apparatus includes several linear arrays located upon the surface of a work station. Articles of manufacture pass across this surface and over these arrays. Specifically, the apparatus includes several linear arrays of optical fibers positioned such that one end of each of the optical fibers receives light along the surface of this work station area. The other ends of the optical fiber arrays are connected to a fixed matrix plate which is positioned in a camera enclosure to emit light through a lens system onto an optical sensor. In this embodiment, the optical sensor is a random access memory which is continually read by a computational device to determine what portions of the random access memory device have been exposed to light.

Still further in this embodiment, the individual optical fibers are collimated to emit light upon specific elements of the optical random access memory. Therefore, the illumination of a specific element of the random access memory directly correlates to the illumination of the location of that fiber element end upon the work station surface. The output from the memory is digital data indicating the edge locations of the articles upon the work station surface.

In another embodiment of the present invention several linear arrays of the optical fibers are arranged at the work station in an orthogonal and three dimensional relationship. Additionally, the spacing between the fibers ends at the work station is different than the fiber end spacing at the camera enclosure end of the fiber optical fiber bundle. By varying the distance between the optical fibers at the work station end, the resolution of the vision system can be effectively varied.

BRIEF DESCRIPTION OF THE DRAWINGS

The novel features believed characteristics of the invention are set forth in the appended claims. The invention itself, however, as well as a preferred mode of use will best be understood by reference to the following detailed description of an illustrative embodiment when read in conjunction with the accompanying drawings, wherein:

DETAILED DESCRIPTION OF THE PREFERRED EMBODIMENT

In the preferred embodiment, this invention is applied to a work place for manufacturing articles of clothing. The articles of manufacture are cloth material which are essentially two dimensional in nature. However, it should be understood, that this invention is also capable of detecting the positional orientation of an article having three dimensions. The purpose of this invention is to provide digital data indicating the edge locations of these articles. For articles of known shapes and dimensions, an attached computer can determine the center of the article and further can direct a robotic arm to the article to pickup the article wherein the article will be grasped in a known orientation.

Figure 1:
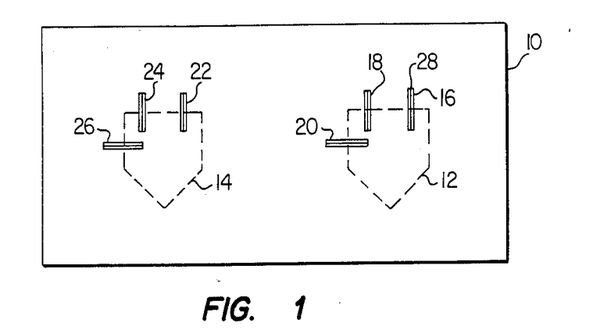
FIG. 1 is a top view of a work station surface including the ends of optical fiber bundles comprising six linear optical fiber arrays in accordance with a preferred embodiment of the present invention.
Figure 2:
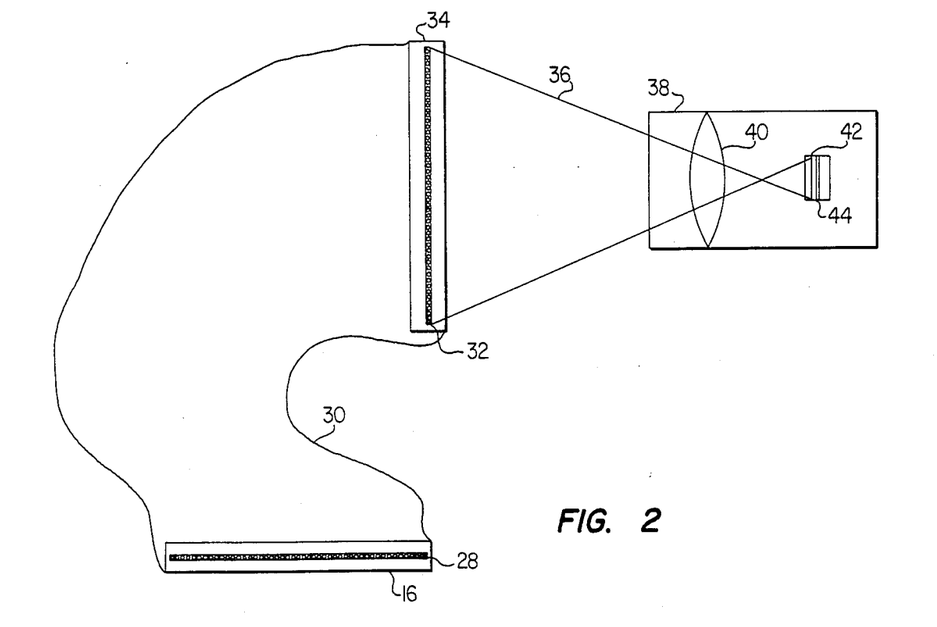
FIG. 2 is a symbolic view of a single bundle of optical fibers forming a single linear arrays of FIG. 1 positioned to illuminate an optical random access memory.

FIG. 1 illustrates a work place 10 containing two articles of manufacture 12 and 14. In the preferred embodiment these articles of manufacture 12 and 14 represent pockets for denim blue jeans. The object of the invention is to provide data representing the positional orientation of these pockets 12 and 14. The work station 10 includes several linear arrays 16, 18, 20, 22, 24, and 26. Each linear array includes an optical fiber ribbon 28 having a linear arrangement of optical fiber ends, as shown in FIG. 2. When the pockets 12 and 14 are positioned over these linear arrays, light is blocked from illuminating the optical fibers underneath the pockets.

FIG. 2 illustrates a symbolic view of the linear array 16 including the linear ribbon 28 of optical fiber ends. The optical fibers of linear array 16 are contained within an optical fiber bundle 30 which terminates in a second linear array 34 exposing the opposite ends of the optical fibers to provide an optical fiber ribbon 32. The ribbon 32 is optically coupled as illustrated by field of view 36 through a lens 40 to an optical RAM 42 that is contained within a camera enclosure 38. In the preferred embodiment, the linear array 34 is positioned on one end of the camera enclosure 38. The purpose of the camera enclosure 38 is to minimize the amount of extraneous light to the optical RAM 42. The optical RAM 42 provides binary data on lines 44 to indicate which of the fibers are receiving light.

In FIG. 2, the length of ribbon 28 appears to be similar to the length of ribbon 32. In the preferred embodiment, bundle 30 consists of 256 optical fibers that terminate in a optical fiber ribbon 32 that is 2.56 inches in width. Ribbon 28, which is the work station end of bundle 30, is also 2.56 inches wide (i.e., 100 fibers per inch). However, by varying the spacing of the optical fibers in the work station, the apparent resolution of the optical fiber system can be changed, even though the appearance of the fiber ribbons at the camera enclosure always remain the same.

Figure 3:
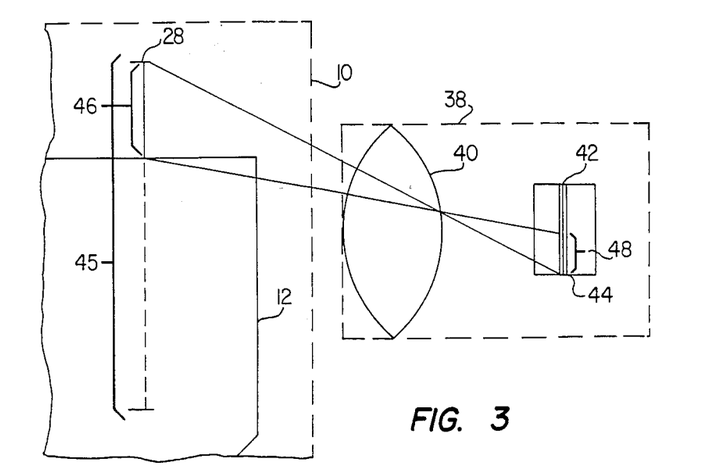
FIG. 3 is a symbolic view of the array and memory of the embodiment of FIG. 2 depicting the illumination of the optical random access memory when a article of manufacture is blocking part of the light transferred to the linear optical fiber array.

FIG. 3 schematically illustrates the illumination of a portion of an optical fiber ribbon 28. The optical fiber ribbon 28 includes a length 45 of which only portion 46 receives light. Since the optical ribbon 28 is located in the surface of work place 10, light above the work place surface irradiating down upon the work space surface is blocked by work piece 12 from all but portion 46 of the optical fiber ribbon 28. As a result, only a portion 48 of the optical RAM 42 is illuminated through the lensing system 40. This action indicates one edge of the work piece 12. In a similar manner the other edges of the work piece are located. Thus, by using the three optical fiber ribbons of the arrays 16, 18 and 20, the position of work piece 12 upon work space 10 is determined.

Figure 4:
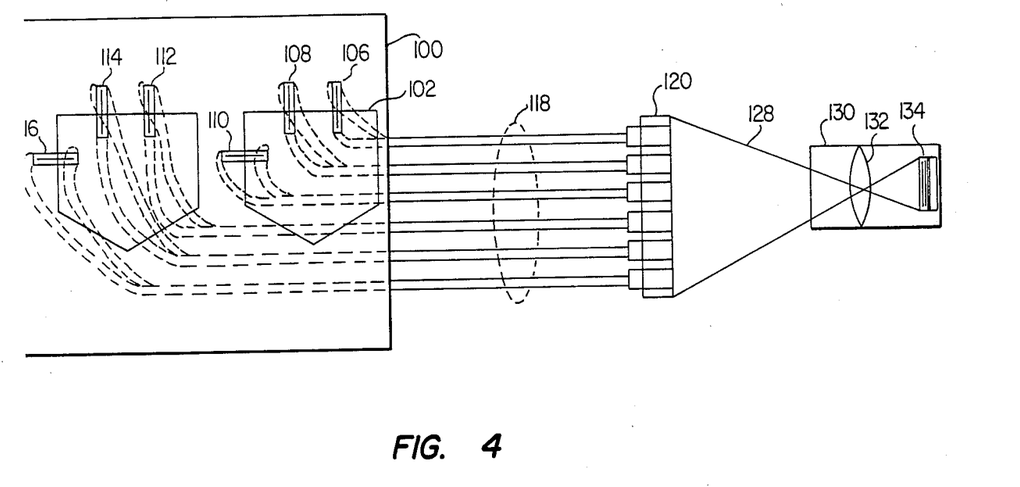
FIG. 4 is a symbolic showing of the relative locations of the optical fiber bundles, linear arrays, the work station surface, the lensing mechanism and the optical random access memory of the embodiment of FIGS. 1–3.

FIG. 4 illustrates the coupling of the optical system of a preferred embodiment of the present invention. Specifically, a work space 100 includes 6 linear arrays 106, 108, 110, 112, 114, and 116 each positioned on the work space surface. Work pieces 102 and 104 are illustrated at a position above the linear arrays as the work pieces travel across work space 100. Each of the linear arrays 106–116 are coupled to an optical fiber bundle 118 that terminates in an array matrix 120. The matrix 120 includes several linear optical fiber ribbons 121–126, shown in FIG. 5, corresponding to each of the linear arrays 106–116 of work place 100. A lens 132 provides a field of view 128 to transfer light from the array matrix 120 to an optical random access memory 134.

Figure 5:
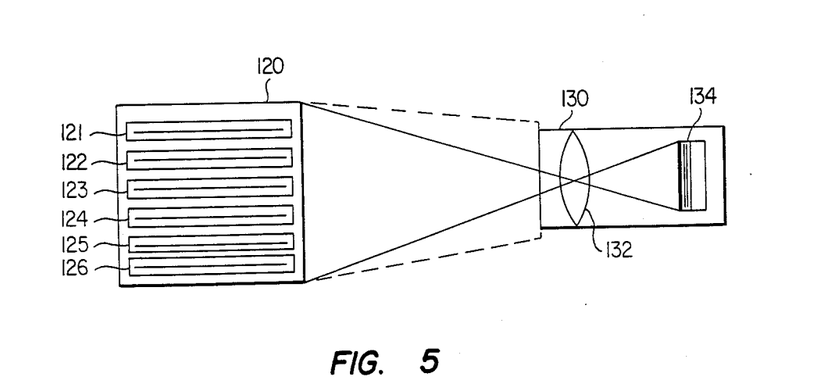
FIG. 5 is an exploded view of a camera enclosure for the optical fiber arrays, the lens and the optical random access memory of the embodiment shown in FIGS. 1–4.

FIG. 5 more clearly illustrates the linear ribbons 121–126 within the array matrix 120 which is, in FIG. 5, exploded from the left most end of the camera enclosure 130. It should be appreciated that the camera enclosure 130 is a light sealed structure that enables only the light from the linear ribbons 121–126 to enter the interior portion of the light enclosure 130 and illuminate the surface of the optical RAM 134.

Figure 6:
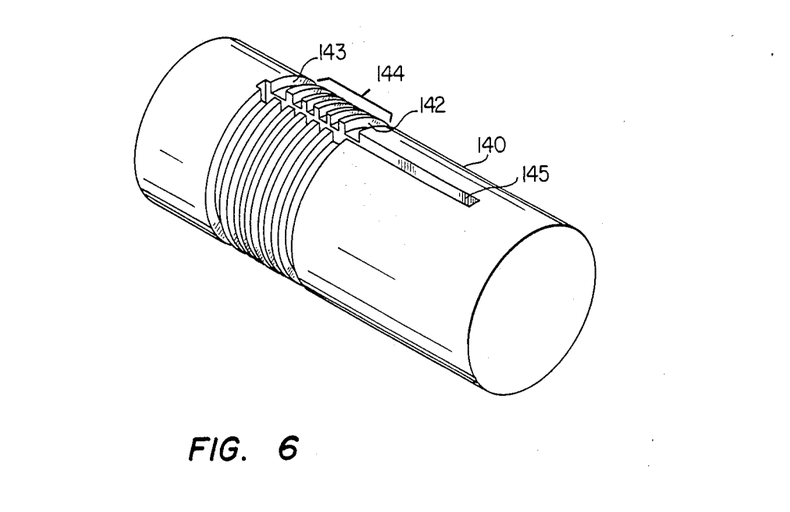
FIG. 6 is an isometric view of a cylinder used to position the optical fiber bundles shown in FIG. 4 to form a linear array.

FIG. 6 illustrates a cylinder 140 used to assemble the linear optical fiber ribbons 121–126. Cylinder 140 includes two relatively large circumferential grooves 142 and 143 and several relatively small circumferential grooves 144. The larger grooves 142 and 143 receive relatively large fibers (not shown) that serve as locational reference fibers. Smaller fibers (not shown) are positioned in grooves 144 as light transmitting fibers. A longitudinal channel 145 is provided along a portion of the periphery of cylinder 140 to receive a mold (not shown). When the fibers are in place in grooves 142, 143 and 144, the mold is assembled by way of channel 145 underneath and above the fibers in grooves 142, 143, and 144. Epoxy is injected under pressure into this mold to seal the relative positions of the fibers in grooves 142, 143, and 144 relative to one another. After the epoxy has hardened, the mold and fiber bundle are removed from cylinder 140. The mold is then removed from the optical fiber ribbon assembly and the ends of this ribbon assembly are appropriately machined and surfaced by conventional means to permit reception or emission of light. The epoxied fiber bundle is then assembled in a linear array structure at the work place or at the matrix plate, the reference fibers which were in grooves 142 and 143 serving as the means to locate the optical fibers which were in grooves 144.

In an alternative embodiment, the matrix plate 120 of FIG. 5 is replaced by a solid plate that includes selectively drilled holes to receive individual optical fibers. Once these fibers have been assembled in their respective holes, the optical fiber bundle is sealed and fixed to the matrix plate 120 in a conventional manner that will not interfere with the light transmissivity property of the individual fibers.

Figure 7:
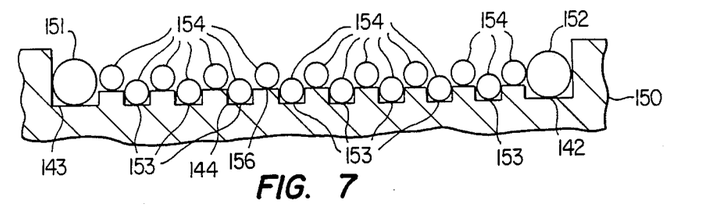
FIG. 7 is a longitudinal cross-sectional view of the cylinder of FIG. 6.

FIG. 7 illustrates a longitudinal cross-sectional view of cylinder 140 of FIG. 6 showing the optical fiber arrangement. Reference fibers 151 and 152 are provided in their respective grooves 143 and 142. Intermediate optical fibers 153 and 154 are provided in two separate layers. As shown, eight fibers 153 lie in spaced apart grooves 144. Eight fibers 154 are each positioned between two of fibers 153 on ridges 156. The purpose for this configuration of optical fibers is explained by reference to FIG. 8.

Figure 8:
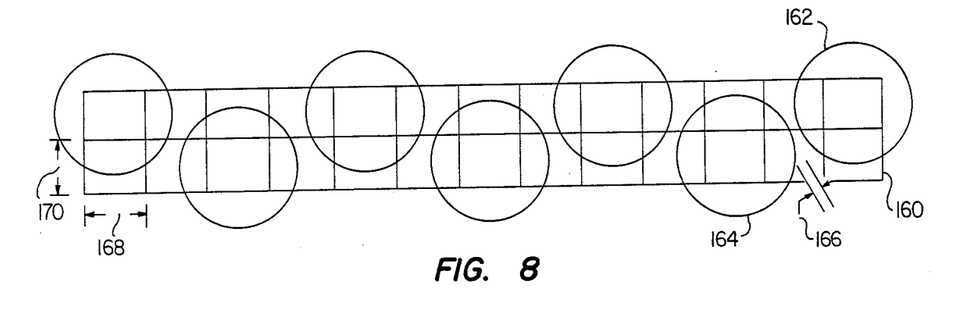
FIG. 8 illustrates the fiber illumination of the individual pixel elements of the optical random access memory shown in FIGS. 2–5.

FIG. 8 illustrates one aspect of a preferred embodiment of the optical random access memory 134. Optical memory elements 160 are positioned in two rows upon the surface of the optical random access memory 134. The specific topology of optical random access memory 134 requires that a linear optical fiber array such as that of FIG. 7 illuminate circular portions 162 and 164 of memory elements 160. This illumination occurs by focusing individual light elements onto portions 162 and 164 of the array, as illustrated at FIG. 8. Light striking a particular memory element 160 will cause the capacitor of that element which is initially precharged to discharge. Thus initially, the optical random access memory elements exposed to light are refreshed, as in a conventional computer dynamic random access memory. The remaining elements not exposed to light maintain their charged state.

To access the data in the optical random access memory, the memory is addressed by column and row in a conventional fashion. As those skilled in the art can appreciate, the positioning of the optical fibers 153 and 154 is critical to the focusing of the emitted light from the ends of the optical fibers onto memory elements 160 in FIG. 8. Typically, the spacing 166 between the illumination of area 164 and 162 is on the order of $8 \times 10^{-4}$ inches.

In a preferred embodiment the height 170 of a memory cell 160 is $4 \times 10^{-3}$ inches and the width of each cell 160 is about $5 \times 10^{-3}$ inches. The illumination of these elements is provided from optical fibers that are 10 mills in diameter. In this preferred embodiment the optical random access memory requiring such a focusing arrangement is the IS32 Optical RAM by Micron Technology of Boise, Id. The camera lens is preferably a 16 mm lens having an F stop of 1:1.4. The aperture of the lens is opened to 1.4. The lens is preferably positioned as shown in FIG. 5 between the surface of optical RAM 134 containing and the matrix array 120, to focus each fiber optic end upon a respective one of the random access memory elements, as shown in FIG. 8.

Figure 9:
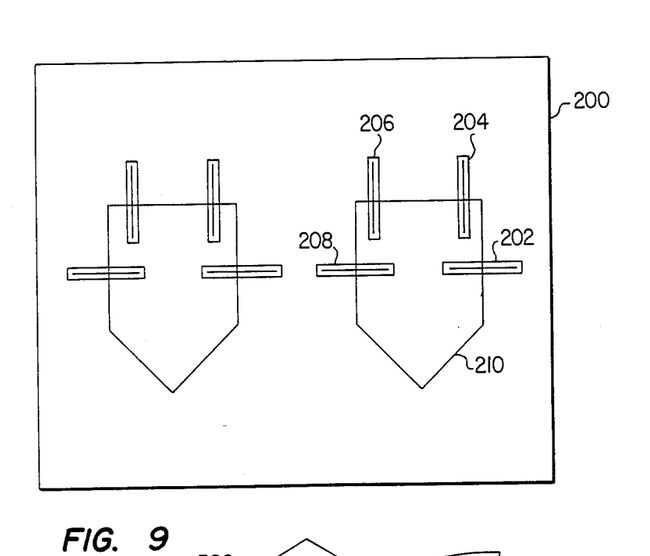
FIG. 9 is a top view of a work station in accordance with another embodiment of the present invention having four linear arrays per work piece to determine the location and orientation of the work piece.
Figure 10:
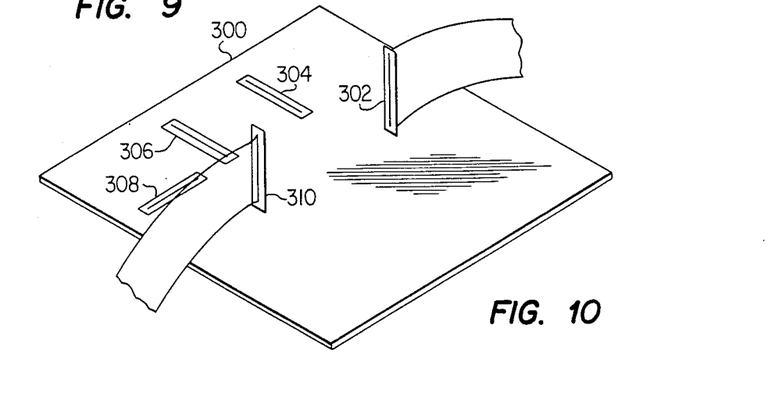
FIG. 10 is an illustration of a work station in accordance with another embodiment of the present invention including three dimensional orthogonally positioned linear arrays for detecting the location and position of a three dimensional work piece.

FIG. 9 illustrates another embodiment of the present invention having four linear arrays 202, 204, 206 and 208 on a work station 200 to determine the center of work piece 210. Yet another embodiment of the present invention is shown in FIG. 10. Linear arrays 302, 304, 306, 308, and 310 are provided in a three dimensionally orthogonal relationship to permit the invention to determine the position and orientation of a three-dimensional work piece (not illustrated).

In a preferred embodiment, the optical random access memory 134 is connected to a microprocessor (not shown), preferably a Motorola model 68701, which provides dynamic refresh in scanning the data of the optical RAM. This microprocessor also provides data to an external host computer concerning the location of the work piece being processed. This is accomplished through a serial RS-232 communications port or by a parallel port. When not accessing the data, the microprocessor provides refresh signals to the random access memory.

Figure 11A:
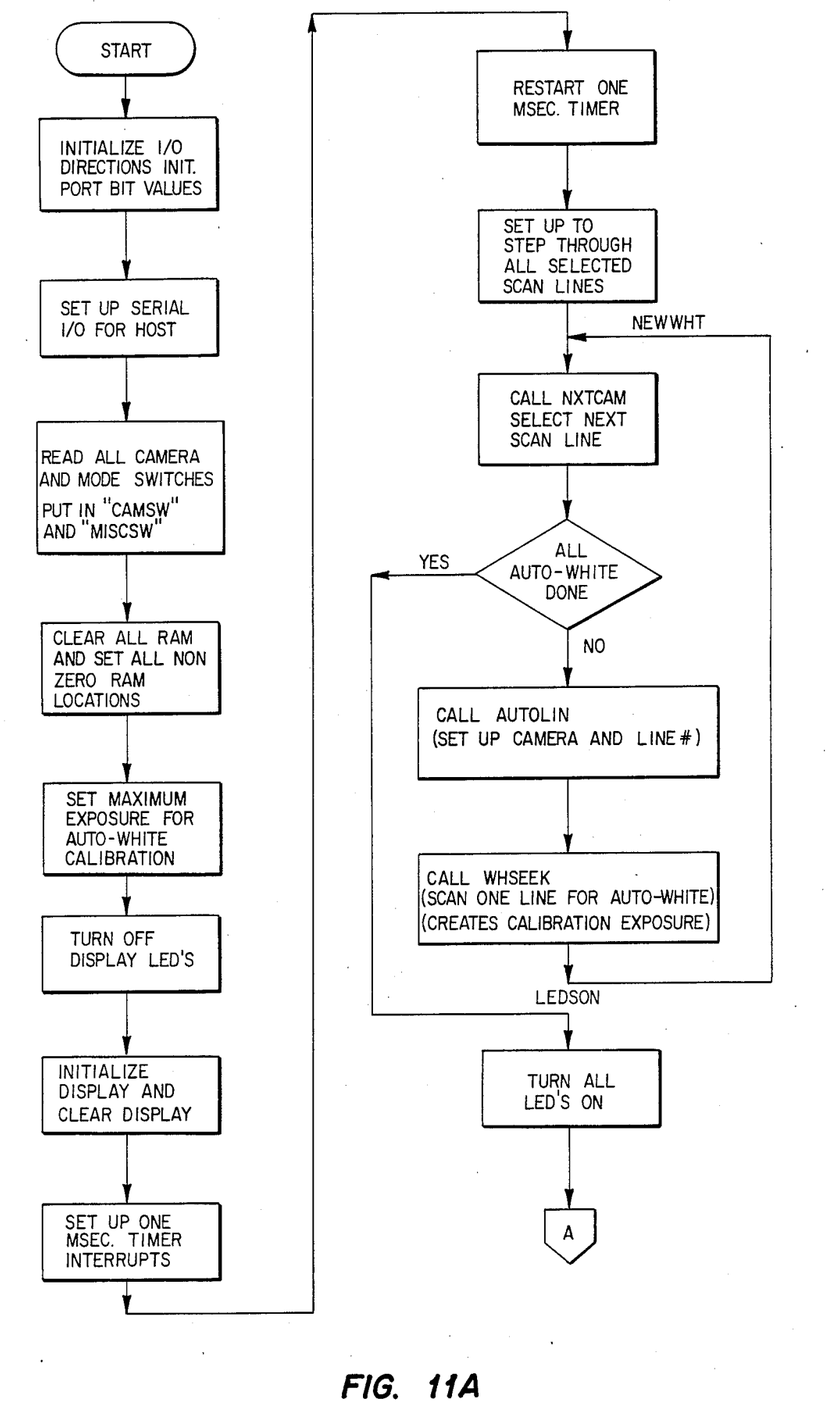
FIGS. 11A, B, and C are flowcharts for the software used to access data from the optical random access memory shown in FIGS. 2–5.
Figure 11B:
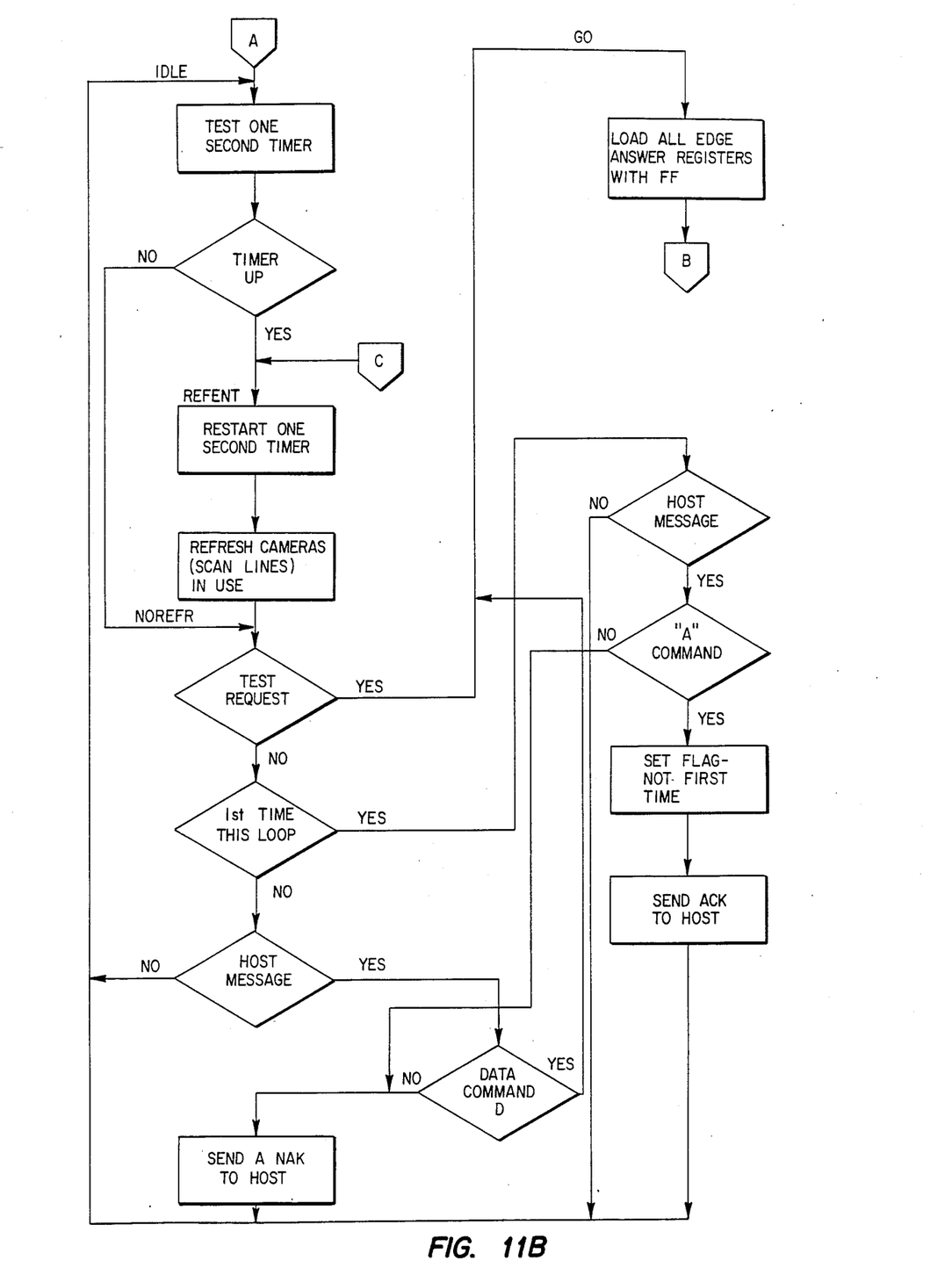
Figure 11C:
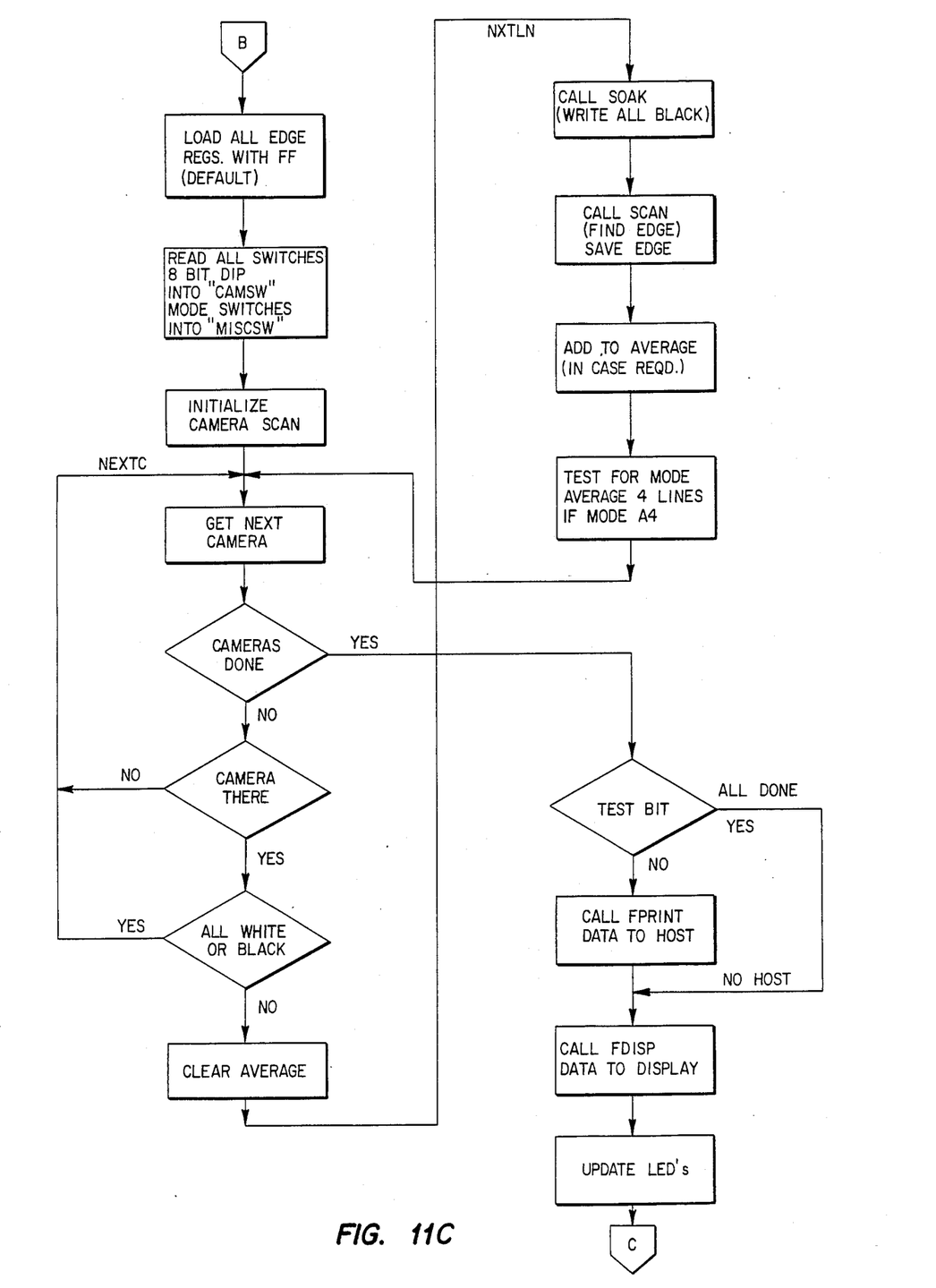

FIGS. 11A, 11B, and 11C detail a functional flowchart of the software executed by the microprocessor of the present invention. It should be understood that the essential function of the microprocessor is to access and read the optical random access memory and to provide an output to either an operator display or a host computer as to the edge locations of the work pieces in a work station. Generally speaking, the function is that of determining which of the fibers within a line have been exposed to light and which have not in order to locate the edge of the work piece on each of the arrays on the work station surface that have been optically coupled to the optical RAM through the optical fibers as previously discussed.

The use of the IS32 OPTIC RAM ™ by Micron Technology, Inc. requires the microprocessor of this invention to perform not only the read task but to perform what is termed "setting the exposure time". Simply, the operation of this optical RAM requires that the RAM locations receive a "1" and then after some time, to be termed "exposure time", the RAM is read. This optical RAM is configured so that the individual memory elements that have been exposed to light will lose their charge, i.e. these elements will transition from the "1" to a "0" stored value. As those skilled in the art should appreciate, if the time between the writing of a "1" and the reading of the memory contents is too long, all the memory elements will discharge whether they are exposed to light or not. However, if this time between the write operation and read operation is too short, all the memory elements would still be 1's even if they were exposed to light, i.e. they had not had enough time to be discharged. Therefore, the microprocessor used in the present invention is required to perform a conventional calibration to determine the appropriate exposure time.

Another functional requirement to be performed by the microprocessor is that of determining when a true edge has been detected. This requirement is present because the work pieces involved in the specific application of this invention are pieces of cloth whose edges may be frayed or contain lint. Therefore, the microprocessor also performs a conventional algorithm to determine, if in fact, the edge detected is in fact the true edge.

Referring to FIG. 11A, the microprocessor begins execution at the start position after either a reset signal is received or after power up. The first function accomplished is the initialization of the Input/Output ports. Next, the executed software initializes the serial Input/Output ports for communications with the host computer. As previously explained, this invention may or may not be used with a host computer. In an embodiment employing a host computer, this computer would perform a robotic function based upon the positional information provided by the invention. However, this invention may be used without a host computer to display positional data to an operator on an operator display.

Next, the software determines which cameras the invention is to access and what mode the invention is to operate in by reading externally set switches. Specifically, the invention may operate off a single scan line from eight separate cameras or, alternatively, operate eight scan lines of a single camera. In the preferred embodiment, a single camera is used to read eight lines that are provided to the camera enclosure. Specifically, the control words used to determine the camera and mode operations are "CAMSW" and "MISCSW". The software then clears all the optical RAM memory locations.

The auto-white calibration algorithm (setting exposure time) is next performed and involves the scanning of the memory elements representing pixels to determine if they are all white after they have been refreshed and all exposed to light. This calibration algorithm starts at the maximum value that has been set by a constant in software, which in the preferred embodiment is approximately 100 milliseconds. According to the auto-white calibration algorithm, all pixels of the line are scanned. If all pixels have discharged, the exposure time is decreased. This operation continues until at least one pixel does not transition. Then the exposure time is increased by approximately eight percent. It should be understood that the auto-white calibration sequence is performed when all the scan lines are exposed to light.

The auto-white calibration sequence is illustrated in FIG. 11A as including the NXTCAM, AUTOLIN, and WHSEEK subroutines as illustrated. The auto-white sequence is exited along the LEDSON line as shown wherein the LED's on the operator display are turned on.

Referring to FIG. 11B, the software enters the idle loop at 2A wherein the 1 second timer is tested and if the 1 second timer has times out, the timer is restarted and all the camera scan lines are refreshed. If the 1 second timer is not timed out, these steps are skipped and then the test switch is read to determine if a request is present. If a request is present, the presence of this request signifies that there is no host computer connected and the operation of the invention and the microprocessor software is performed providing output data only to the operator display and not to the communications port. If the test switch request line is not present, then, conversely, there is a host computer present and communications must be established during the first loop as shown by the next decision step. This next step determines if the host has sent an "A" which is to be acknowledged by the microprocessor. The A command by protocol is the first command from the host to establish communication with the microprocessor. If a message has not been received, then the software loops through the idle loop again. Upon the second time through, again, the host message is examined. The software will remain in a loop until a message has been received. If the message received is a "D" then the sequence is started. However, if neither the "A" command of the "D" command are not received at the appropriate times, a no acknowledge "NAK" is sent to the host via the communications port.

Given that all the communications with the host are properly established, the software then executes along the GO line as shown in FIG. 11B by first loading all edge answer registers with "FF" (hexidecimal). The "FF" is the default condition for the registers, i.e. all "1's". The camera switch "CAMSW" and mode switch "MISCSW" are then read and a camera scan is next initialized. Each of the scan lines of the cameras are then individually read as shown. If all the lines are white or black, the next camera or camera scan line is read. If the lines contain both black and white information then the edge is determined. The algorithm for determining the edge determines which pixel location has transitioned and then reads the next 20 pixels. If there is an additional transition within the next 20 pixels, the new transition point is stored and then the next 20 pixels are read. This process continues until 20 pixels are read without an additional transition. This 20 pixel overscan technique is included to determine if the proper edge has been detected and not merely a piece of thread or a piece of lint. Additionally, this same loop will provide an average if a mode is selected that includes 4 scan lines located at each array location on the work station. In other words, instead of a single line of fibers, 4 lines of fibers are located parallel to each other and the 4 lines in the camera are each individually addressed to determine where the edge is for that line. The edge data for the 4 lines is then averaged to provide the edge location.

After all the camera lines have been scanned, the results are output to the operator display and, if a host computer is present, this information is provided to the host through the communications port. The software then loops back to node 2B which is illustrated in FIG. 11B.

By operating in this manner, the edge line information is provided for determining the location, position and orientation of a work piece on the work place or work surface.

The preferred embodiments described above utilize optical fibers to receive the light and transmit it to an optical RAM. However, it is understood that the present invention also includes the use of photocells or other light receiving devices which can generate electrical signals directly for interacting with a conventional random access memory in accordance with the present invention. It is expected that the claims of the present application cover this variation.

Although the invention has been described with reference to specific embodiments, this description is not meant to be construed in a limiting sense. Various modifications of the disclosed embodiments as well as other alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An apparatus for vision detecting the location and orientation of an individual object having multiple offset edges on a lighted surface, the apparatus comprising:
   a plurality of spaced apart light receiving arrays disposed on said surface and operatively cooperative to provide simultaneous light signals indicative of a positional orientation of said object thereover, said arrays being arranged in a predetermined pattern to receive light in the portions of each array uninterrupted by respective edges of said object for which location and orientation on said surface is to be determined;
   light transmission means responsive to the light receiving portions of said light receiving arrays for conducting received light irradiated upon said light receiving arrays to a relatively remote location at which the patterns of transmission are emitted optically symmetrical with respect to the patterns of light received by said receiving array portions;
   optical sensor means at said remote location in communication with the emitted light of said light transmission means for producing electrical signals responsive to the patterns of light received by said light receiving means and directly corresponding to dimensions of said portions of said arrays which receive light; and
   projecting means at said remote location optically intervening between said light transmission means and said optical sensor means for optically communicating the pattern of transmission emitted from said light transmission means to said optical sensor means.

2. An apparatus according to claim 1 wherein said light transmission means for each of said arrays includes a plurality of individual light conducting fibers discretely arranged in the patterns of said arrays, with one end of said fibers being located in a light communicating relation with said light receiving array.

3. An apparatus according to claim 2 wherein said light conducting fibers include opposite ends arranged in patterns optically symmetrical with the patterns of said one end for optical projection by said projection means to said sensor means.

4. An apparatus according to claim 3 wherein said sensor means includes a plurality of individual light sensing elements, each element collimated to receive light from an individual one of said fibers.

5. An apparatus according to claim 4 wherein said electrical signal from said light sensor means includes binary data.

6. An apparatus for vision indicating the location and orientation of an individual object having multiple offset edges in an illuminated work area, said apparatus comprising:
   a plurality of spaced apart arrays operatively cooperative to provide simultaneous light signals indicative of a positional orientation of said object, relative to said work area, based on the edge positions of said object thereover, each array including a group of light conducting fibers elements arranged in a predetermined first pattern correlated to the location indications of said object edges to be obtained, each fiber having one end in light communicating with the illuminated work area and positioned contiguously juxtaposed in the pattern of said array elements to the one end of the other fibers of the same array in the work area, said arrays being disposed such that light to at least two arrays is at least partially obstructed from illumination by the edges of a partially overlying object for which location and orientation on said work area is to be determined;
   light sensing means for producing electrical signals indicating a transfer of light from each fiber to which light had been communicated by said array elements in correlation to the location and orientation of an overlying object;
   each array of said fiber groups having opposite ends of said fibers positioned contiguously to effect a second pattern of light emission optically symmetrical with respect to said first pattern whereby said electrical signals may be directly correlated to the shapes of said second patterns to thereby be combinatively indicative of the location and orientation of the individual object in the work area; and
   lens means optically intervening between the opposite ends of said fibers and said light sensing means to project said second patterns onto said light sensing means.

7. An apparatus according to claim 6 wherein each array is positioned in the surface of the work area and wherein at least one array is orthogonally positioned relative to at least one other array.

8. An apparatus according to claim 7 wherein said fiber array opposite ends are collectively positioned as a matrix for exposure to the light sensing means.

9. An apparatus according to claim 8 wherein said fiber array opposite ends, said lens means and said light sensing means are contained within an enclosure.

10. An apparatus according to claim 9 wherein said light sensing means includes individual light sensitive elements, each collimated to an individual fiber opposite end, said elements each providing an electrical signal indicating a transfer of light to its respective fiber opposite end.

11. An apparatus for vision indicating different edge locations of an individual planar work piece having multiple offset edges upon an illuminated work surface for determining the location and orientation of said work piece, said apparatus comprising:
   a plurality of spaced apart linear arrays of light conducting fibers operatively cooperative to provide simultaneous, linearly configured light signals having lengths indicative of a positional orientation of said work piece thereover, each array including fibers having one end disposed for illumination on said working surface at locations at which said work piece edges are to be positioned, said fiber ends being located so that at least two arrays are at least partially obstructed from illumination by the edges of a work piece on the work surface and wherein at least one array is orthogonally located relative to one of the other arrays;
   each of said arrays including fibers having an opposite end positioned linearly relative to the opposite ends of the other fibers of said array to collectively form a matrix;

an optical sensing device having a plurality of individually addressable light sensitive elements, each of said elements being responsive to one of said opposite fiber ends forming said matrix to generate an electrical signal indicative of the presence of light at said one opposite fiber end;

lens means optically intervening between said opposite fiber ends and said optical sensing device for projecting light emitted at said opposite ends onto respective of said light sensitive elements in a plurality of essentially linear arrays configurationally similar to said light signals; and computational means for addressing said elements of said optical sensing device and for generating a data signal indicating the edge locations of said work piece on the work surface.

12. An apparatus according to claim 11 wherein said optical sensing device is an optical random access memory.

13. An apparatus according to claim 11 wherein said computational means includes means for computing said edge locations from said addressed element signals.

14. An apparatus according to claim 13 wherein said means for computing said edge locations includes an algorithm for determining false edge indications from said addressed element signals.

15. An apparatus according to claim 13 wherein said means for computing said edge locations includes means for calibrating the element signals in response to varying amounts of light exposure upon the elements.

16. An apparatus according to claim 11 wherein said arrays each include parallel lines of fiber ends and wherein said computational means includes means for averaging the edge location indications of said parallel lines for each array for determining the edge locations.

17. An apparatus according to claim 11 wherein at least one fiber end array is in a plane orthogonally located relative to a plane defined by at least two of the remaining fiber end arrays.

18. An apparatus according to claim 11 wherein said computational means includes means for computing the location of a work piece center for a predetermined work piece dimension.

19. An apparatus according to claim 11 wherein said computational means includes means for providing said data to an external device.

20. An apparatus according to claim 3 wherein said opposite fiber ends of at least some of said arrays extend linearly and the opposite ends of said arrays are collectively connected to a fixed matrix plate.

21. An apparatus according to claim 20 including a light impervious enclosure in which said matrix plate is contained and said lens means communicates the emitted light from said fixed plate matrix to said optical sensor means.

22. An apparatus according to claim 20 in which the common ends of the light conducting arrays are formed as linear optical fiber ribbons.

23. An apparatus according to claim 22 in which said common ends are secured bundled together in a predetermined pixel relation.

24. An apparatus according to claim 11 wherein said optical sensing device is a charge coupled device.

25. An apparatus according to claim 23 in which said arrays are disposed separated in spaced apart patterns on said surface with each array pattern being operative concomitantly with another to emit light signals for at least two separate objects on said surface.

26. An apparatus for vision detecting on a lighted surface the relative location and orientation of a plurality of individual objects each having multiple offset edges, the apparatus comprising:

a plurality of spaced apart light receiving arrays disposed on said surface and operatively cooperative to provide simultaneous light signals indicative of a positional orientation of one of said individual objects thereover, said arrays being arranged in a predetermined pattern to receive light in the portions of each array uninterrupted by the edges of said individual objects for which relative location and orientation on said surface is to be determined;

light transmission means responsive to the light receiving portions of said light receiving arrays for conducting received light irradiated upon said light receiving arrays to a relatively remote location at which the pattern of transmission is emitted optically symmetrical which respect to the pattern of said receiving array portions;

optical sensor means at said remote location in communication with the emitted light of said light transmission means for producing an electrical signal responsive to the pattern of light received by said light receiving means and corresponding to said portions of said arrays which receive light; and projection means at said remote location optically intervening between said light transmission means and said optically sensor means for optically communicating the pattern of transmission emitted from said light transmission means to said optical sensor means.

27. An apparatus for vision indicating in an illuminated work area the location and orientation of a plurality of individual objects each having multiple offset edges, said apparatus comprising:

a plurality of spaced apart arrays operatively cooperative to provide simultaneous light signals indicative of a positional orientation of the respective of said objects based on the edge positions of said individual objects thereover, each array including a group of light conducting fiber elements arranged in a predetermined first pattern correlated to the location indications of object edges to be obtained, each fiber having one end in light communication with the illuminated work area and positioned contiguously juxtaposed in the pattern of said array elements to the one end of the other fibers of the same array in the work area, said arrays being disposed such that light to at least two arrays are at least partially obstructed from illumination by the edges of each partially overlying object for which location and orientation on said work area is to be determined;

light sensing means for producing electrical signals indicating a transfer of light from each fiber to which light had been communicated by said array elements in correlation to the location and orientation of an overlying object;

each array of said fiber groups having opposite ends of said fibers positioned contiguously to effect a second pattern of light emission optically symmetrical with respect to said first pattern;

lens means optically intervening between the opposite ends of said fibers and said light sensing means to project said second pattern onto said light sensing means; and computational means for receiving the signals from said light sensing means and for generating a data signal indicating the relative edge locations of the respective of said objects on the work surface.

28. Apparatus for detecting the position and orientation of an article relative to a work surface upon which the article is disposed, the article having first and second edge portions, said apparatus comprising:

means for illuminating a portion of the work surface;

first and second light transmission means for receiving and transmitting light directed onto the illuminated portion of the work surface, said first and second light transmission means having spaced apart receiving end portions positioned within the illuminated portion of the work surface and adapted to be partially covered by the first and second edge portions of the article in a manner transmitting through said first and second light transmission means first and second light patterns configurationally symmetrical to the uncovered portions of said receiving end portions, and transmitting end portions for outwardly projecting said first and second light patterns, said first and second light patterns having lengths combinatively indicative of the position and orientation of the article relative to the work surface;

a light sealed housing having an inlet opening to which said transmitting end portions of said first and second light transmission means are operatively connected to project said first and second light patterns into the interior of said housing; and pattern detecting means, disposed within said housing in a spaced relationship with said transmitting end portions of said first and second light transmission means, for receiving said first and second light patterns and responsively generating first and second output signals which are indicative of the lengths of the received first and second light patterns and thereby directly indicative of the position and orientation of the article relative to the work surface.

29. The apparatus of claim 28 wherein:

said first and second light transmission means comprise first and second optical fiber ribbon members.

30. The apparatus of claim 29 further comprising:

lens means, interposed between said transmitting end portions and said pattern detecting means within said housing, for focusing upon said pattern detecting means the first and second light patterns outwardly projected from said transmitting end portions of said first and second light transmission means.

* * * * *